UNITED STATES PATENT OFFICE.

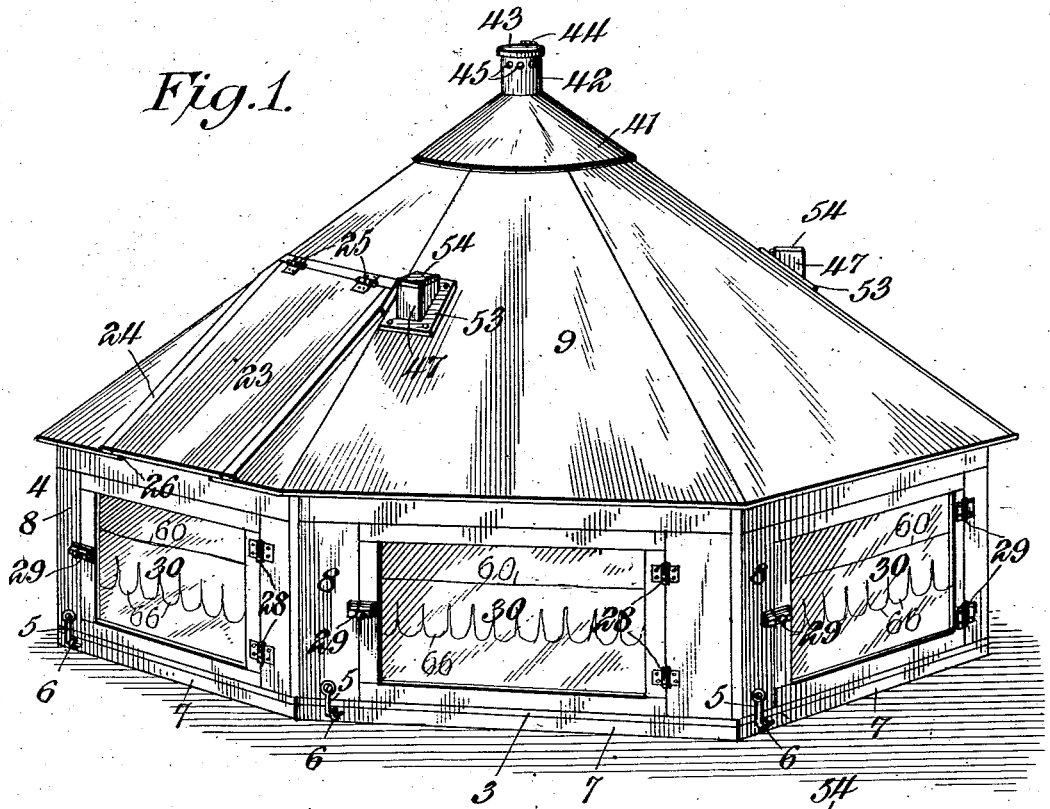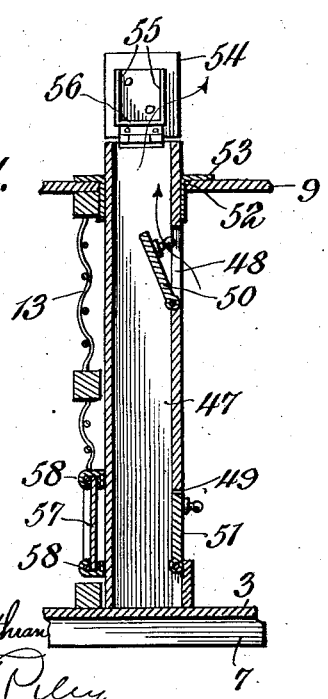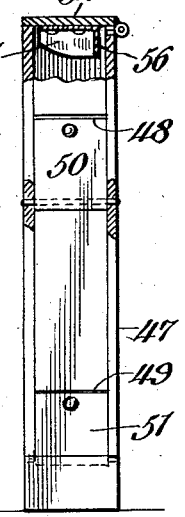

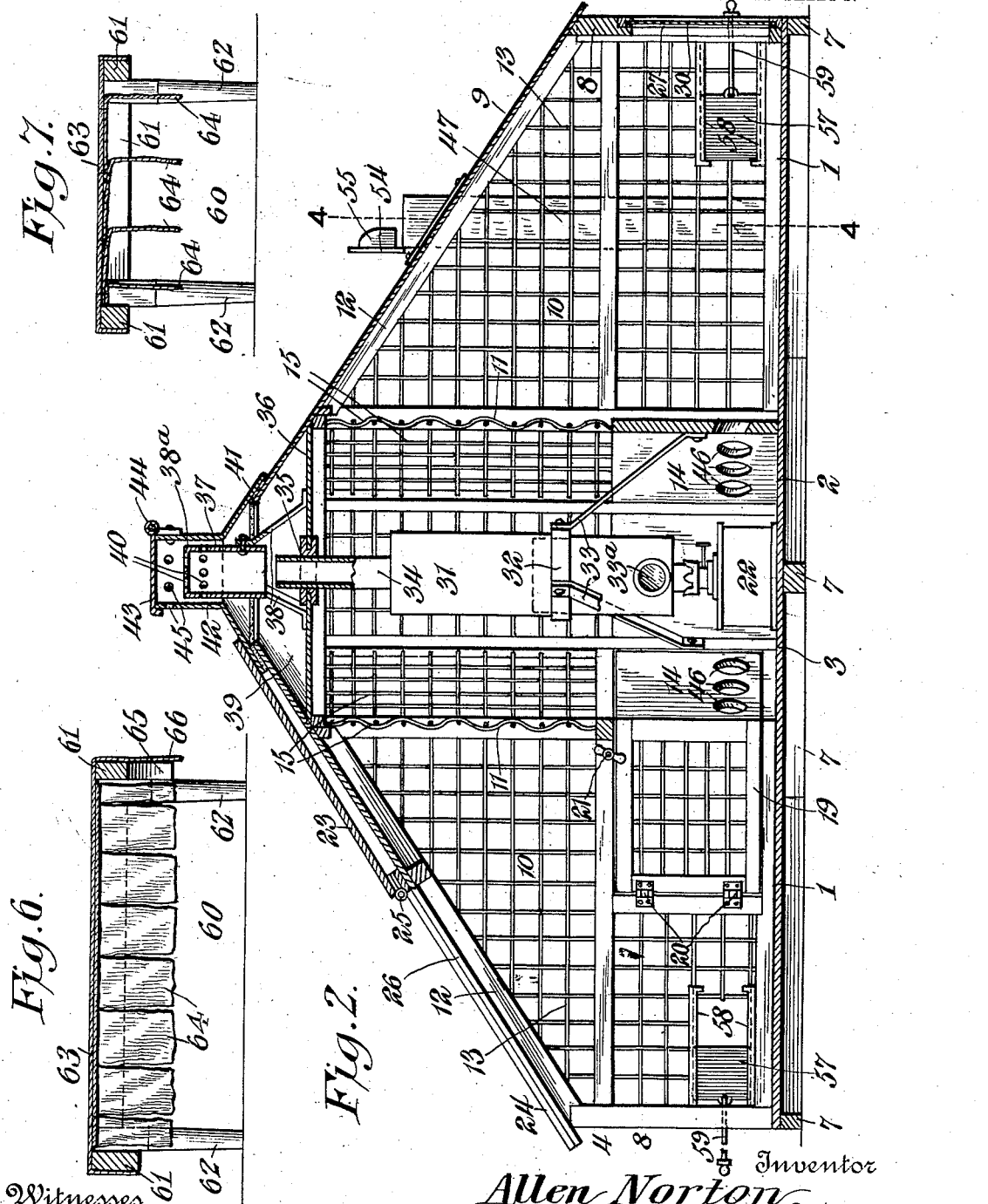

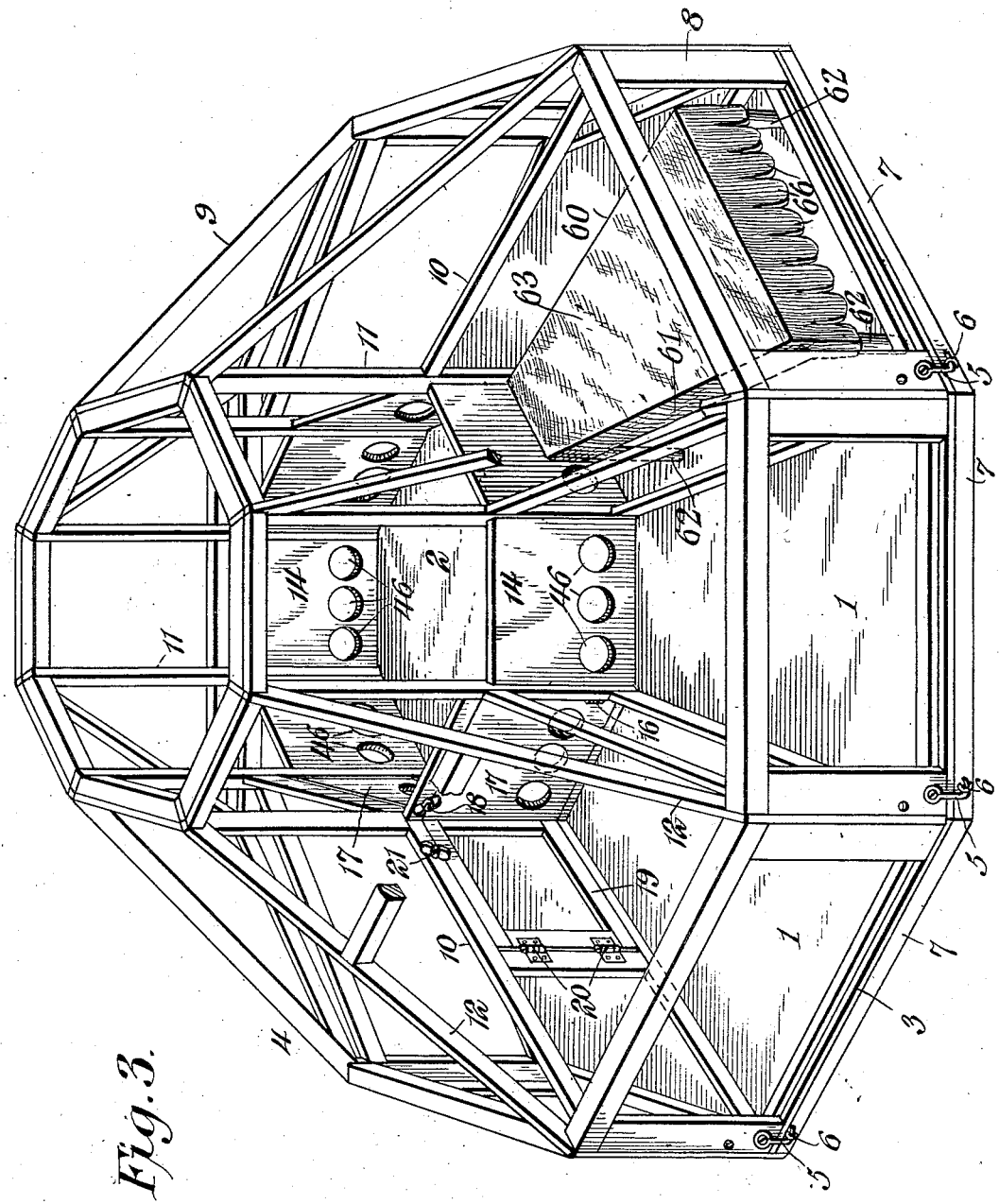

ALLEN NORTON, OF SEDALIA, MISSOURI.

POULTRY-BROODER.

1,120,738. Specification of Letters Patent. Patented Dec. 15, 1914.

Application filed September 30, 1911. Serial No. 652,135.

*To all whom it may concern:*

Be it known that I, ALLEN NORTON, a citizen of the United States, residing at Sedalia, in the county of Pettis and State of Missouri, have invented a new and useful Poultry-Brooder, of which the following is a specification.

The invention relates to improvements in brooders.

The object of the present invention is to improve the construction of brooders, and to provide a simple, efficient and comparatively inexpensive brooder, equipped with means for maintaining it at an accurate even temperature, and of causing a perfect ventilation of the same, adapted to prevent foul air from remaining within the brooder, and capable of insuring a constant supply of fresh air.

A further object of the invention is to provide a brooder of this character, adapted to afford ready access to the heating means and also to its interior, whereby the brooder may be easily maintained in a perfectly sanitary condition.

With these and other objects in view, the invention consists in the construction and novel combination of parts hereinafter fully described, illustrated in the acompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a perspective view of a poultry brooder, constructed in accordance with this invention. Fig. 2 is a vertical sectional view of the same. Fig. 3 is a perspective view, illustrating the construction of the frame-work of the brooder. Fig. 4 is a vertical sectional view on the line 4—4 of Fig. 2. Fig. 5 is an elevation, partly in section, illustrating the construction of the ventilators. Fig. 6 is a longitudinal sectional view of one of the removable covers. Fig. 7 is a transverse sectional view of the same.

Like numerals of reference designate corresponding parts in all the figures of the drawings.

In the acompanying drawings in which is illustrated the preferred embodiment of the invention, the casing of the poultry brooder is of octagonal form to provide eight outer poultry receiving compartments 1 around an inner central heating compartment 2, but the brooder may be made of rectangular, hexagonal, or any other preferred form to secure the desired capacity. The casing of the brooder consists of a bottom or base 3 and a removable body 4, detachably secured upon the bottom or base 3 by hooks 5 and eyes 6, but any other suitable fastening means may be employed for this purpose. By removably mounting the body of the brooder upon the bottom or base, ready access is afforded to the interior of the brooder to enable the same to be thoroughly cleaned and easily maintained in a perfectly sanitary condition. The bottom or base 3 preferably consists of a floor and sills 7, adapted to support the floor above the ground or other supporting surface to prevent dampness, and to enable the brooder to be maintained in a perfectly dry condition.

The removable body portion of the brooder consists of vertical walls 8 and a conical top 9. The vertical walls, which are located at the outer edges of the bottom or base, are arranged in octagonal form, and the conical top, which may be constructed of any suitable material, extends outwardly beyond the upper edges of the vertical walls to shed water completely beyond the same and prevent any leakage into the brooder at the spaced edges of the side walls.

The interior of the body is divided into the central heating compartment 2 and the surrounding series of compartments 1 by means of vertical radially arranged partitions 10, extending inwardly from the vertical walls at the angles formed by the same and terminating short of the center of the brooder and connected at their inner ends by vertical transversely disposed partitions 11, arranged in octagonal form in parallelism with the corresponding outer walls. The radially arranged partitions 10 consist of suitable frame-work, composed of vertical bars and horizontal connecting bars and having top members 12, arranged at an inclination and forming rafters for the tapered or conical top or roof 9. The radial partitions are preferably covered with woven wire 13 of any suitable mesh, adapted when the doors, hereinafter described, are closed to prevent young chickens or other fowls from passing from one compartment to another. The transverse partitions, which have vertical bars and horizontal connecting cross pieces, are also provided with lower solid sections 14 and upper sections 15 of woven wire, or other suitable material. At two of the compartments the lower solid portions of the transverse partitions are hinged at 16 to form adjacent doors 17, which are supported by pivoted buttons 18, or other suitable fastening devices in their closed position, and the radial partition at the adjacent ends of the doors 17 is provided with a door 19, located at the lower inner portion of the said radial partition and hinged at its outer end at 20 to the frame-work of the partition. The door 19 is mounted within the framework of the partition and is secured in its closed position by a pivoted button 21. The doors 17 and 19 when open afford free access to the interior of the central compartment for adjusting a lamp or heater 22, or otherwise caring for the same, and they enable the lamp or heater to be readily removed from the brooder without detaching the body portion from the bottom or base. The top or roof is also provided with a hinged door 23, located at the side at which the doors 17 and 19 are located to facilitate the adjustment or control of the lamp or heater. The door 23 is arranged within a frame 24 and is connected to the same by hinges 25. The frame surrounds the side and top of the opening 26 in the top or roof, and it enables the door 23 to extend beyond the opening 26 in the top or roof, and it is adapted to prevent rain from entering the brooder around the edges of the door 23.

The front or outer walls are provided at each poultry receiving compartment with a door 27, hinged at one end 28 and secured at the opposite edge by a catch 29. The door preferably consists of a frame and a plate or pane 30 of glass, or other transparent material, and the plates or panes of the outer or front doors are adapted to light up the interior of the brooder and assist in preventing accumulation of vermin, and in maintaining the brooder in a sanitary condition.

The lamp or heater 22, which may be of any preferred construction, is arranged beneath a heating drum 31 through which the products of combustion pass, and which is mounted in a support consisting of a ring or band 32 and inclined braces 33. The band 32 surrounds the drum and the braces are secured to the same and to the lower portions of the adjacent transverse partitions. The drum is preferably provided at the lower portion with an opening covered with isinglass 33ᵃ to enable the operator to see the flame of the lamp or heater in order to properly adjust the latter. The drum is provided at the upper end with a tubular extension 34, projecting upwardly through a central opening 35 in a horizontal partition 36, extending across the central portion of the conical roof at a point beneath the apex thereof and arranged in the plane of the upper edges of the transverse partitions. The lamp is protected from down drafts by a tubular shield 37, supported by legs 38 in the space 39 above the partition 36, and having an open lower end located above the tubular extension 34 and provided with an upper end wall 38ᵃ. The upper end wall 38ᵃ and the upper portion of the shield 37 are provided with small perforations 40 for the passage of the products of combustion. The upper portion of the shield 37 extends into the tubular portion of the hood and is arranged concentric with the same. The shield extends within a hood consisting of a conical or tapered lower portion 41 and an upper cylindrical portion 42. The lower tubular portion caps the conical top or roof, and the upper cylindrical portion is provided at the upper end with a cover 43, hinged at one side at 44 and adapted to be opened or closed as desired. The cover 43 is imperforate and the hood is provided below the cover with perforations 45 to permit the escape of the products of combustion when the cover is closed.

The transverse partitions, which form the walls of the inner heating compartment, are provided in the lower portions of their solid sections 14 and in the doors 17 with draft openings 46, sufficiently small to prevent young chicks, or other fowls from passing through them from the outer compartments to the central compartment, and adapted to permit the stove or heater to cause a draft through the lower portions of the transverse partitions. The walls of the openings 46 incline upwardly and inwardly, as clearly shown in Fig. 2 of the drawings, to facilitate an upper draft through them. The results from the heated air ascending in the central or heating compartment and a positive circulation of air through the brooder is thereby produced.

The brooder is equipped with a plurality of vertically disposed tubular ventilators 47, constructed of any suitable material and extending from the bottom of the brooder through the top or roof and provided within the brooder with upper and lower openings 48 and 49 and having doors 50 and 51, located at the upper and lower openings for controlling the passage of air through the same. The tubular ventilator projects above the top or roof and is provided around the opening 52 of the same with flashing 53, adapted to prevent leakage around the ventilating tube. The upper end of the ventilating tube is equipped with a hinged cap 54, having depending flanges 55 and 56, located at opposite sides of the cap and adjacent to the hinged end thereof and adapted when the cap is partially raised to constrict the opening at the upper end of the tubular ventilator to regulate the passage of air into or out of the brooder. The upper and lower interiorly arranged openings 48 and 49 are adapted to permit the escape of foul air and the entrance of fresh air, and when one of the draft doors of the ventilating tube is open, the other is closed. When the upper one is open, the heated air in the upper portion of the poultry receiving compartment is permitted to escape and when the upper draft door is closed and the lower one is open, a down draft through the ventilating tube is created by the heater to cause fresh air to pass into the brooder. By means of the heater and the draft controlling means an even temperature may be maintained within the brooder and a thorough ventilation of the same secured.

No claim is made in the present application to the ventilator structure.

Each of the radial partitions is equipped at its outer portion with a door 57, preferably mounted to slide in suitable horizontal guides 58 and connected at its outer end with an operating rod 59, or other suitable means for sliding the door 57 to open and close the same. The slidable door 57 may be mounted in any other desired manner, or any other desired form of door may be employed for permitting young fowls to pass from one compartment to another. By permitting the fowls to run through the brooder in this manner, they are afforded sufficient exercise to maintain them in a healthy condition. By closing the slidable door 57 the young fowls may be confined in separate compartments at night, so that there will be no danger of their smothering one another.

The brooder is equipped with removable covers 60, adapted to be readily placed in and removed from the poultry receiving compartments of the brooder, and designed to mother the young chicks and other fowls at night. The covers 60, which are tapered to conform to the configuration of the tapered poultry receiving compartments, consist of an open tapered horizontally disposed frame 61, supported by legs 62 and carrying a fabric covering 63 from which depends flexible strips 64 of fabric, or other suitable material. The horizontal frame 61 is composed of inwardly converging side bars and inner and outer connecting end bars, and the legs 62 are secured to the bars of the frame in the angles formed by the same. The fabric covering 63, which may consist of cotton, wool, or any other suitable material, extends entirely over the frame and is suitably secured to the side and end bars thereof, and is extended downwardly over the outer faces of the said bars. The front end bar is recessed or cut-away at 65, and the front end of the fabric covering depends at the cut-away portion and is slit or scalloped to provide depending strips or portions 66. The fabric strips 64 are arranged in horizontal rows between the sides of the frame, and they are suitably secured to the fabric covering, as clearly illustrated in Figs. 6 and 7 of the drawings. These covers may be used when desired, for instance, while the chicks and other fowls are very young, and they may be removed when the fowls increase in size. The covers are easily taken out and replaced for cleaning and other purposes.

Having thus fully described my invention, what I claim as new and desire to secure by Letters Patent, is:—

1. A brooder of the class described comprising a casing, radially arranged partitions constructed of foraminous material and extending inwardly from the walls of the casing and terminating short of the center thereof to form outer brooder compartments, and inner partitions arranged transversely of the inner ends of the said compartments and connecting the radial partitions and forming a central heating chamber which is surrounded by the brooder compartments, said transverse partitions having lower draft openings and provided with upper foraminous portions, the draft openings being arranged to cause an inward draft through the lower portion of the brooder compartments and the said upper foraminous portions of the transverse partitions permitting heated air to pass from the central chamber into the brooder compartments.

2. A brooder of the class described comprising a casing consisting of a bottom, relatively low outer vertical walls and a substantially conical top surmounting the said vertical walls, radial partitions constructed of foraminous material and extending inwardly from the outer walls of the casing and terminating short of the center thereof to form outer brooder compartments, and inner transverse partitions connecting the inner ends of the radial partitions and extending above the outer vertical walls to the conical top and forming a central heating compartment which is surrounded by the outer brooder compartments, said transverse partition having lower draft openings arranged to cause an inward draft through the lower portions of the brooder compartments, and the said transverse partitions being also provided with upper foraminous portions arranged to permit heated air to pass from the central compartment into the brooder compartments, the said conical top of the casing being arranged to deflect such heated air downwardly.

3. A brooder of the class described including a casing comprising a bottom, vertical outer walls, and a conical top, radial partitions extending inwardly from the walls of the casing and terminating short of the center thereof to form outer brooder compartments, said partitions being also extended from the bottom to the top of the casing and tapered to fit the top, inner vertical partitions connecting the inner ends of the radial partitions to form a central heating chamber and extending from the bottom to the top of the casing and having lower draft apertures and upper openings, which permit heated air to pass into the brooder compartments, a horizontal partition connecting the upper ends of the inner partitions and extending entirely across the top of the casing, ventilators extending through the top of the casing and communicating with the interior of the brooder, and a hood arranged at the apex of the top and having a cover.

4. A brooder of the class described including a casing comprising a bottom, vertical walls, and a conical top, radial partitions extending inwardly from the walls of the casing and tapered to fit the top thereof and terminating short of the center of the casing to form outer brooder compartments, inner vertical transverse partitions connecting the inner ends of the radial partitions, said transverse partitions forming a central heating chamber and having lower draft apertures and upper openings adapted to permit heated air to pass from the central chamber into the outer brooder compartments, a horizontal top partition extending entirely across the top of the casing to form an upper central space or compartment, a hood arranged at the apex of the top and having a tubular portion provided with a cap, and means for permitting products of combustion to pass from the central heating chamber into the said upper central space or compartment.

5. A brooder of the class described including a casing comprising a bottom, vertical walls, and a conical top, radial partitions extending inwardly from the walls of the casing and tapered to fit the top and terminating short of the center of the casing to form outer brooder compartments, inner vertical transverse partitions connecting the inner ends of the radial partitions to form a central heating chamber and having lower draft apertures and upper openings to permit heated air to pass from the central chamber into the outer brooder compartments, a horizontal top partition connecting the upper ends of the inner transverse partitions and extending entirely across the top of the casing to form an upper central space or compartment, a hood arranged at the apex of the top of the casing and having a tubular portion provided with a cap, a tubular shield located in the said upper central space or compartment and arranged in spaced relation with the horizontal partition and having an open lower end and provided with an upper end wall, said shield being extended into the tubular portion of the hood and provided at the top with perforations, and means for permitting products of combustion to pass from the central heating chamber into the said upper space or compartment.

In testimony, that I claim the foregoing as my own, I have hereto affixed my signature in the presence of two witnesses.

ALLEN NORTON.

Witnesses:
   JAMES D. DUNLOP,
   NATHAN L. NORTON.